United States Patent

Koketsu et al.

[11] Patent Number: 5,547,223
[45] Date of Patent: Aug. 20, 1996

[54] WEBBING FOR RESTRAINING A VEHICLE OCCUPANT

[75] Inventors: Eiji Koketsu; Koki Sato; Tetsushi Muromachi; Mutsumu Haraoka; Toshio Nagata; Michihiro Yanagihara; Kuniaki Oma, all of Aichi-ken, Japan

[73] Assignees: Kabushiki Kaisha Tokai-Rika-Denki-Seisakusho; Toyota Shatai Kabushiki Kaisha, both of Aichi-ken, Japan

[21] Appl. No.: 281,027

[22] Filed: Jul. 27, 1994

[30] Foreign Application Priority Data

Jul. 30, 1993 [JP] Japan .................................. 5-190555
Apr. 26, 1994 [JP] Japan .................................. 6-088327

[51] Int. Cl.⁶ ........................................... B60R 22/28
[52] U.S. Cl. ...................... 280/805; 280/801.1; 297/470
[58] Field of Search .................... 280/801.1, 805, 280/802, 808; 188/376; 297/470, 471, 472

[56] References Cited

U.S. PATENT DOCUMENTS

| 3,074,760 | 1/1963 | Hodgekin | 297/472 |
| 3,891,272 | 6/1975 | Takada | 297/472 |
| 4,027,906 | 6/1977 | Matsuoka et al. | 280/805 X |
| 4,515,254 | 5/1985 | Markov et al. | 188/371 |
| 5,050,906 | 9/1991 | Kneip | 280/805 |

FOREIGN PATENT DOCUMENTS

| 0128662 | 12/1984 | European Pat. Off. | 280/805 |
| 0408909 | 1/1991 | European Pat. Off. . | |
| 1556431 | 1/1970 | Germany . | |
| 1447740 | 8/1976 | United Kingdom . | |

Primary Examiner—Christopher P. Ellis
Attorney, Agent, or Firm—Sixbey Friedman Leedom & Ferguson

[57] ABSTRACT

A webbing for restraining a vehicle occupant, having a webbing length increasing device which is folded over and sewn together along a transverse direction of the webbing, and when a load applied between a vehicle occupant and the webbing length increasing device exceeds a sewing strength of the webbing length increasing device, stitching of the webbing length increasing device comes undone, the webbing length increasing device having at least a first sewn-together portion and a second sewn-together portion, the second sewn-together portion being provided at a webbing fold tip end side of the first sewn-together portion and having a sewing strength which is smaller than a sewing strength of the first sewn-together portion. Load applied between the vehicle occupant and the webbing, when a length of the webbing is increased at a time of sudden deceleration of a vehicle, is reduced gradually.

18 Claims, 10 Drawing Sheets

×2 = LENGTH BY WHICH WEBBING IS INCREASED

WEBBING FOR RESTRAINING A VEHICLE OCCUPANT

BACKGROUND OF THE INVENTION

1. Field of the Invention

The present invention relates to a webbing for restraining a vehicle occupant which is used in a seat belt device of a vehicle.

2. Related Art

In a three-point seat belt device, while a webbing which is inserted through a shoulder anchor is pulled out from a take-up device, a tongue plate, through which a portion of the webbing is inserted, is engaged with a buckle which is fixed to the vehicle body or to a seat. In this way, the webbing forms a lap webbing portion, which contacts the lap portion of the vehicle occupant, and a shoulder webbing portion, which contacts the vehicle occupant from the chest to the shoulder.

At ordinary times, the webbing can be pulled out from the take-up device. However, when the vehicle suddenly decelerates, pulling-out of the webbing from the take-up device is prevented, the vehicle occupant is restrained so as to not move inertially toward the front of the vehicle, and the vehicle occupant can be protected.

It is preferable to provide a means, such as that described hereinafter, so that the vehicle occupant is not subject to excessive pressure at this time.

A portion of the webbing is folded over along the transverse direction thereof and is sewn together so as to form a loop. When the vehicle occupant is restrained, when the tensile force applied to the webbing increases and reaches a predetermined value, the stitching comes undone. In this way, the length of the webbing can be increased by the length by which the loop becomes linear. Inertial movement of the vehicle occupant by an amount, which corresponds to the amount by which the length of the webbing is increased, is allowed, so that the pressure applied to the vehicle occupant is suppressed. When the loop becomes linear, from then on, inertial movement of the vehicle occupant is restricted.

However, immediately after the stitching of the webbing comes undone, the load applied between the vehicle occupant and the webbing is reduced.

When the load suddenly drops to zero or to a low load which is near zero, vibrations are generated in the webbing, which results in deterioration of the pressure suppressing function thereof.

Accordingly, it is necessary to suppress a sudden reduction in load.

SUMMARY OF THE INVENTION

In view of the aforementioned, an object of the present invention is to provide a webbing for restraining a vehicle occupant in which, when the length of the webbing is increased, the load applied between the vehicle occupant and the webbing is controlled so as to decrease gradually.

A first aspect of the present invention is a webbing for restraining a vehicle occupant including a webbing length increasing device which is folded over and sewn together along a transverse direction of the webbing, and when a load applied between a vehicle occupant and the webbing length increasing device exceeds a sewing strength of the webbing length increasing device, stitching of the webbing length increasing device comes undone, the webbing length increasing device having at least a first sewn-together portion and a second sewn-together portion, the second sewn-together portion being provided at a webbing fold tip end side of the first sewn-together portion and having a sewing strength which is smaller than a sewing strength of the first sewn-together portion.

In a second aspect of the present invention, in the first aspect, the breaking load of the second sewn-together portion gradually becomes smaller toward the webbing fold tip end side.

In a third aspect of the present invention, in the second aspect, the breaking load is set by the number of stitches.

In a fourth aspect of the present invention, in the third aspect, the number of stitches is set so as to be equal on either side of a line which runs along the longitudinal direction of the webbing and which connects transverse direction central points of the webbing.

In a fifth aspect of the present invention, in the second aspect, the second sewn-together portion is formed from at least one transverse pattern, in which rows of stitches are formed at predetermined lengths in the transverse direction of the webbing, and at least one substantially longitudinally pattern, in which rows of stitches extend in a substantially longitudinal direction of the webbing.

In accordance with the webbing for restraining a vehicle occupant of the first aspect, when the vehicle occupant is restrained, tensile load is applied to the webbing.

When this load exceeds the sewing strength of the first sewn-together portion, the stitching thereof comes undone. The length off the webbing increases, inertial movement of the vehicle occupant is permitted, and the pressure applied to the vehicle occupant is suppressed.

After the stitching of the first sewn-together portion comes undone, the load reaches the second sewn-together portion. At the second sewn-together portion, as the stitching frays, the length of the webbing increases further. Movement of the vehicle occupant is permitted, and the pressure applied to the vehicle occupant is suppressed. The sewing strength of the second sewn-together portion is less than that of the first sewn-together portion. When the stitching of the second sewn-together portion begins to come undone, the load decreases to a load which is less than the load which undoes the stitching of the first sewn-together portion. While the stitching of the second sewn-together portion is coming undone, this small load falls to an even smaller load.

Accordingly, when the length of the webbing increases, the load applied between the vehicle occupant and the webbing is controlled such that a sudden decrease in the load is prevented and the load decreases gradually.

In accordance with the webbing for restraining a vehicle occupant relating to the second aspect, the breaking load of the second sewn-together portion gradually decreases toward the webbing fold tip end side. Therefore, while the stitching of the second sewn-together portion is coming undone, the load gradually decreases. Accordingly, when the length of the webbing increases, the load applied between the vehicle occupant and the webbing is controlled such that a sudden decrease in the load is prevented and the load decreases gradually.

In accordance with the webbing for restraining a vehicle occupant relating to the third aspect, the breaking load is set by the number of sewn stitches. Therefore, the breaking load can be easily set by gradually decreasing the number of sewn stitches toward the webbing fold tip end side.

In accordance with the webbing for restraining a vehicle occupant relating to the fourth aspect, the number of stitches are set so as to be equal on either side of a line (webbing transverse direction central line) which runs along the longitudinal direction of the webbing and connects transverse direction central points of the webbing. Therefore, the tension of the second sewn-together portion of the webbing is not unbalanced to the left and right of the transverse direction central line of the webbing, and the load applied between the vehicle occupant and the webbing is stable and can be decreased gradually.

In accordance with the webbing for restraining a vehicle occupant of the fifth aspect, while the stitching of the second sewn-together portion is coming undone, a potential increase in load between the respective transverse patterns can be suppressed by the substantially longitudinal pattern. As a result, fluctuations in the load become smooth, and accordingly, when the length of the webbing increases, the load applied between the vehicle occupant and the webbing decreases smoothly.

In accordance with the webbing for restraining a vehicle occupant relating to the first aspect of the present invention, an excellent effect is achieved in that, when the length of the webbing is increased, the load applied between the vehicle occupant and the webbing is controlled so as to fall gradually.

The webbing for restraining a vehicle occupant relating to the second aspect of the present invention provides a superior effect in that, because the breaking load of the second sewn-together portion decreases gradually toward the webbing fold tip end side, when the length of the webbing is increased, the load at the second sewn-together portion decreases gradually, and the load applied between the vehicle occupant and the webbing is controlled so as to fall gradually.

In accordance with the webbing for restraining a vehicle occupant according to the third aspect of the present invention, an excellent effect is achieved in that, because the breaking load is set by the number of sewn stitches, the setting of the breaking load can be effected easily.

The webbing for restraining a vehicle occupant relating to the fourth aspect of the present invention achieves a superior effect in that, because the number of stitches are equal on either side of the transverse direction central line of the webbing, the load applied between the vehicle occupant and the webbing is stable and is controlled so as to decrease gradually.

The webbing for restraining a vehicle occupant relating to the fifth aspect of the present invention achieves an excellent effect in that, due to a combination of at least one transverse pattern and at least one substantially longitudinal pattern, the load at the second sewn-together portion decreases smoothly, and the load applied between the vehicle occupant and the webbing is controlled so as to decrease smoothly.

DESCRIPTION OF THE PREFERRED EMBODIMENTS

A webbing for restraining a vehicle occupant, relating to the first embodiment of the present invention will be described with reference to FIGS. 1 through 3.

Figure 2:
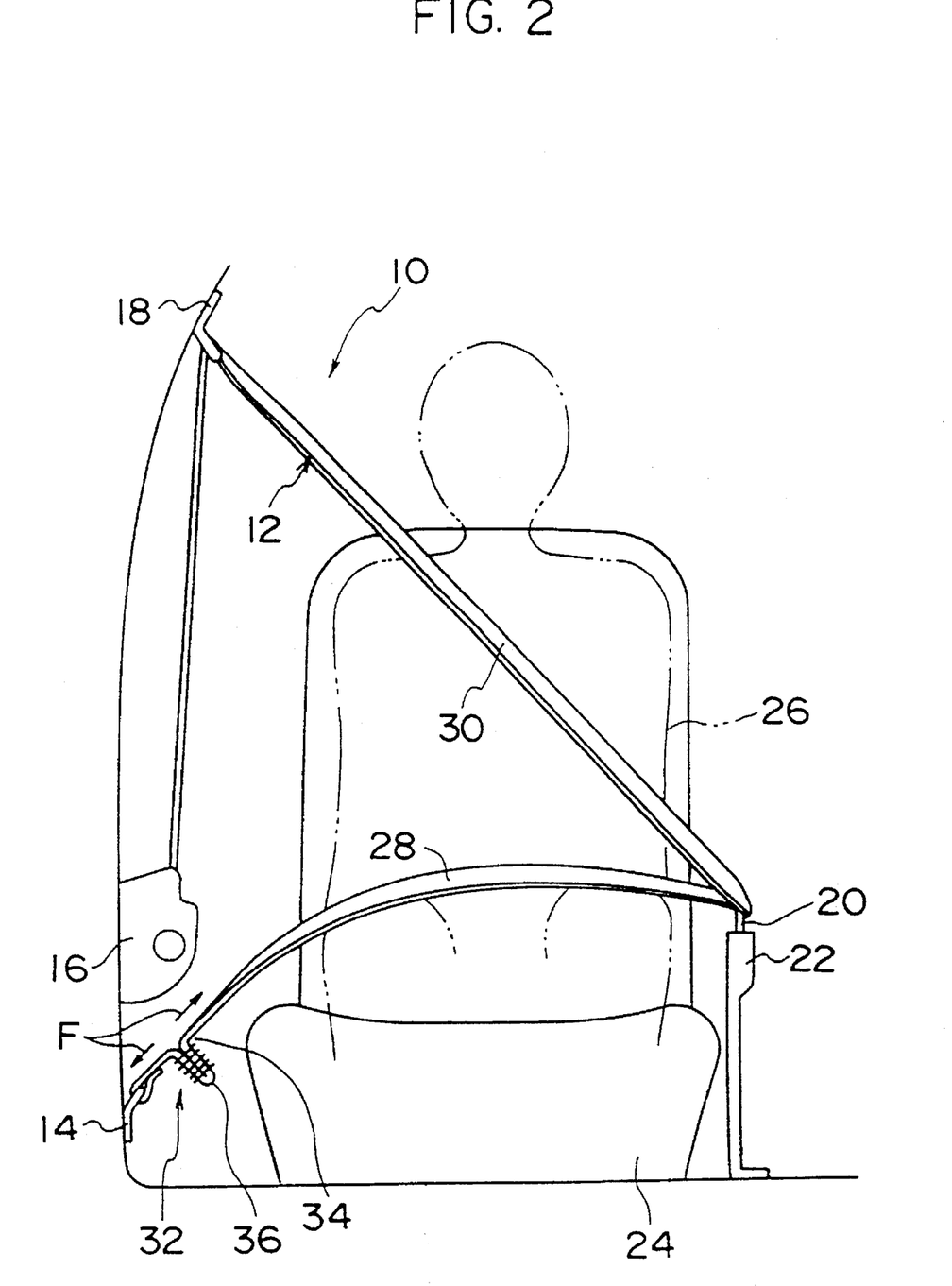
FIG. 2 is a view illustrating a three-point seat belt device to which the webbing for restraining a vehicle occupant of the first embodiment is applied.
Figure 3:
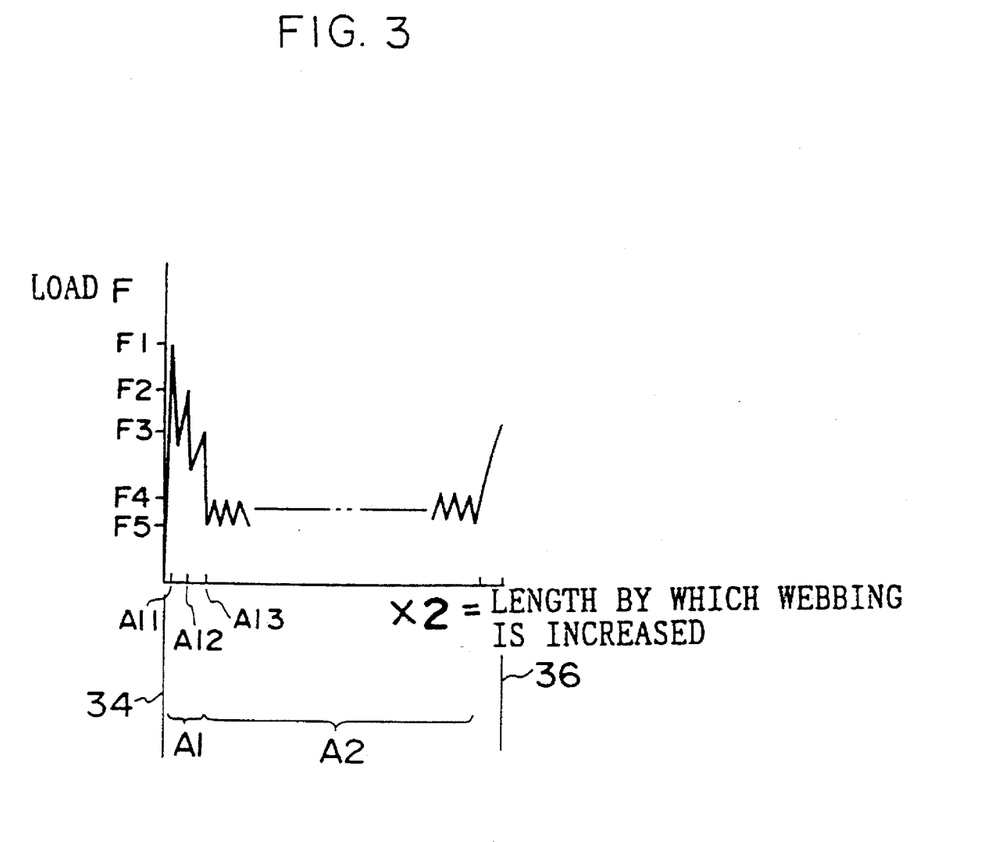
FIG. 3 is a graph illustrating the relation between tensile load applied to the webbing and an increase in length of the webbing, for the webbing for a vehicle occupant relating to the first embodiment.

FIG. 2 illustrates a three-point seat belt device 10 of a vehicle. In the seat belt device 10, one end of a webbing 12 for restraining a vehicle occupant (hereinafter referred to only as "webbing") is engaged with a lap anchor 14 at the lower portion of a side wall of a vehicle. The other end of the webbing 12 is taken up by a take-up device 16 which, similarly to the lap anchor 14, is disposed at the lower portion of the side wall of the vehicle. The intermediate portion of the webbing 12 is inserted through and supported by a shoulder anchor 18 which is at an upper portion of the side wall of the vehicle. A portion of the webbing 12 between the lap anchor 14 and the shoulder anchor 18 is inserted through a tongue plate 20.

A buckle 22 is provided so as to be upright at the side of a seat 24, which side is at the center of the vehicle. When the tongue plate 20 is engaged with the buckle 22, the webbing 12 is applied to a vehicle occupant 26. At this time, the portion of the webbing 12 between the lap anchor 14 and the tongue plate 20 is a lap webbing portion 28 which contacts the lap of the vehicle occupant 26, and the portion of the webbing 12 between the tongue plate 20 and the shoulder anchor 18 is a shoulder webbing portion 30 which contacts the vehicle occupant 26 from the chest to the shoulder.

At ordinary times, the webbing 12 can be pulled out from the take-up device 16. However, when the vehicle suddenly decelerates, the pulling out of the webbing 12 from the take-up device 16 is prevented so that inertial movement of the vehicle occupant 26 towards the front of the vehicle is restricted and the vehicle occupant 26 can be protected.

In a vicinity of the lap anchor 14, the webbing 12 is folded over along the transverse direction thereof and is sewn together so as to form a U-shaped webbing length increasing device 32.

Figure 1:
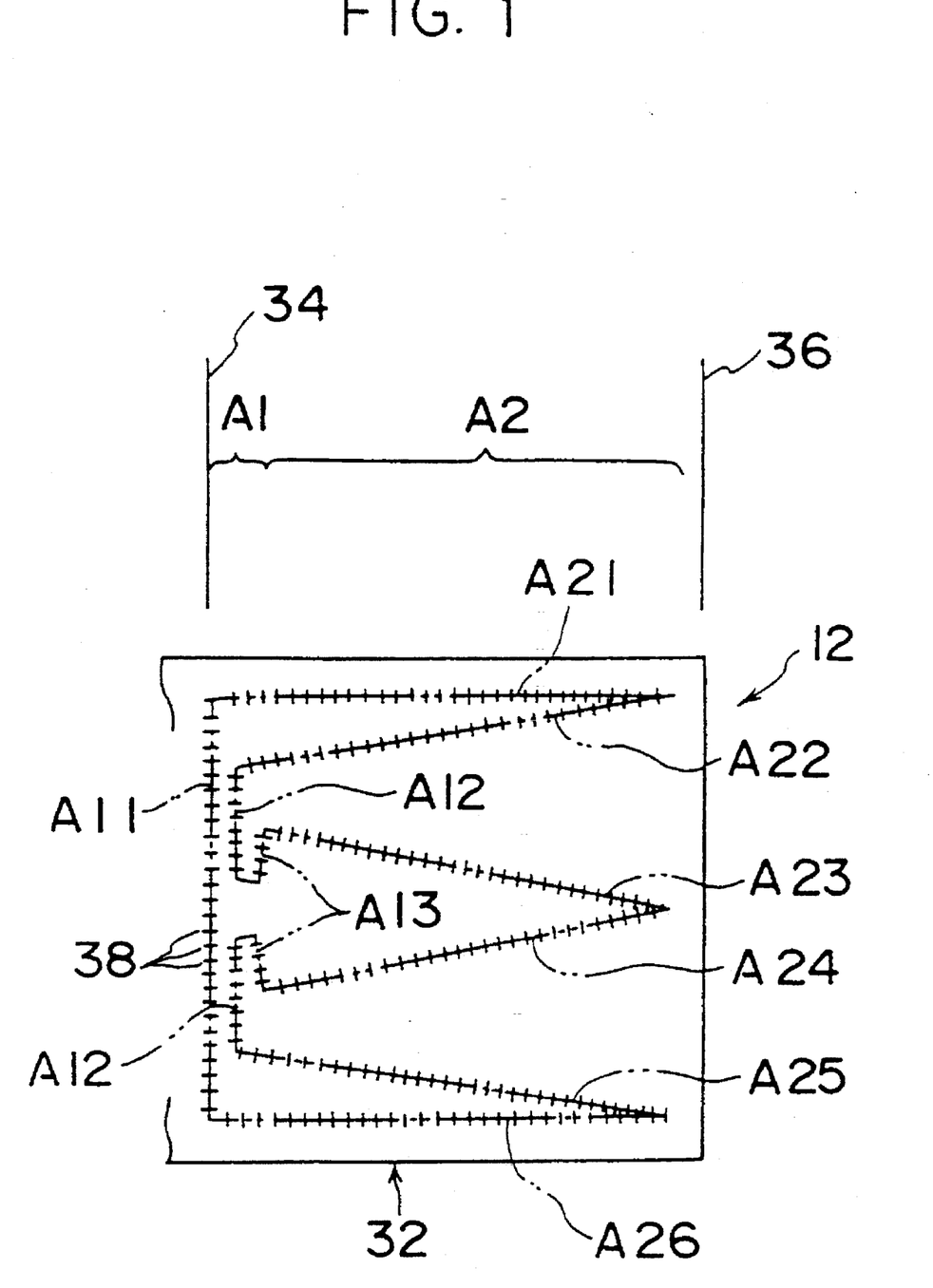
FIG. 1 is a view illustrating a sewn pattern of a webbing length increasing device of a webbing for restraining a vehicle occupant, relating to the first embodiment of the present invention.

As illustrated in FIG. 1, the webbing length increasing device 32 includes a first sewn-together portion A1, which is positioned at a webbing fold base end 34, and a second sewn-together portion A2, which extends between the first sewn-together portion A1 and a webbing fold tip end 36.

The first sewn-together portion A1 has three stitch rows A11, A12, A13 formed by stitches 38 which are aligned in the transverse direction of the webbing 12. The rows of stitches (stitch rows) are indicated by the two-dot chain lines in FIG. 1. In the stitch row A11 positioned at the webbing fold base end 34, the stitches are formed in a row extending over the transverse direction dimension of the webbing. In contrast, the stitch row A12 positioned in the middle and the stitch row A13 positioned nearest to the webbing fold tip portion 36 are formed along the transverse direction of the webbing 12 without any stitches at the respective central portions and respective edge portions thereof in the transverse direction of the webbing 12. Further, the portions at both sides of the stitch row A13 in the transverse direction of the webbing 12 which do not have stitches 38 are larger than those of the stitch row A12. Accordingly, the stitch rows A11, A12, A13 become shorter in that order, and the number of stitches 38 therein become fewer in that order as well. Consequently, the respective sewing strengths of the stitch rows A11, A12, A13 become smaller toward the webbing fold tip end 36.

The second sewn-together portion A2 has six stitch rows whose stitches run along the long sides of three acute triangles which are aligned in the transverse direction of the webbing and whose peak portions are disposed at the webbing fold tip end 36 side.

Stitch rows A21, A22 correspond to the long sides of the triangle at one transverse direction side of the webbing 12, and stitch rows A25, A26 correspond to the long sides of the triangle at the other transverse direction side of the webbing 12. Of these four stitch rows A21, A22, A25, A26, the outer stitch rows A21, A26 are connected to the respective outer ends of the stitch row A11 of the first sewn-together portion A1, and the inner stitch rows A22, A25 are connected to the respective outer ends of the stitch row A12 of the first sewn-together portion A1. Further, the stitch rows A23, A24, which correspond to the long sides of the middle triangle in the transverse direction of the webbing 12, are connected to the respective outer ends of the stitch row A13 of the first sewn-together portion A1.

The first and second sewn-together portions A1, A2 are of a sewn pattern in which all of the stitch rows thereof are continuous as if drawn by a single brush stroke.

Note that the stitches 38 are orthogonal to the directions of the stitch rows.

Hereinafter, operation of the first embodiment will be described. When the webbing 12 restricts the inertial movement of the vehicle occupant 26, tensile load F (see FIG. 2) is applied to the webbing 12. Due to the tensile load F, the stitching of the first and second sewn-together portions A1, A2 successively comes undone toward the webbing fold tip end 36. As the stitching comes undone, the length of the webbing 12 is increased. Inertial movement of the vehicle occupant 26 by an amount, which corresponds to the amount by which the length of the webbing 12 is increased, is allowed, so that the pressure applied to the vehicle occupant 26 is suppressed.

At the first sewn-together portion A1 to which the tensile load F is applied first, the break-resistant load of the sewing thread is the sewing strength. The sewing strength at the first sewn-together portion A1 is large. As illustrated in FIG. 3, when the load F increases to load F1 and exceeds the sewing strength of the stitch row A11, the stitching of the stitch row A11 comes undone.

When the stitching of the stitch row A11 comes undone, the load F temporarily decreases and then increases, and the stitching of the next stitch row A12 comes undone at a load F2 which is smaller than the load F1.

When the stitching of the stitch row A12 comes undone, the load F temporarily decreases and then increases, and the stitching of the next stitch row A13 comes undone at a load F3 which is smaller than the load F2.

In this way, in the first sewn-together portion A1, the stitching of the respective stitch rows A11, A12, A13 comes undone in that order, and the load F is reduced in stages.

Even if the sewing thread of the second sewn-together portion A2 does not break, due to the fraying of the sewing thread at the stitch rows A21 through A26, the stitching comes undone toward the webbing fold tip end 36 and the sewing strength of the sewn-together portion A2 is small. Accordingly, after the stitching of the first sewn-together portion A1 comes undone, the load F is reduced and the second sewn-together portion A2 comes undone at a load F4 which is smaller than the load F3. During the time in which the sewing thread continues to fray, the load F rises and falls repeatedly between the load F4 and a load F5 which is smaller than the load F4. While the second sewn-together portion A2 is coming undone, the load F is not reduced to even smaller loads.

When all of the stitching comes undone, the folded-over portion of the webbing 12 disappears, and the entire webbing 12 becomes linear. From then on, the inertial movement of the vehicle occupant 26 is restrained, and accordingly, the load F increases from F4.

In this way, when the length of the webbing 12 is increased, the load applied between the vehicle occupant 26 and the webbing 12 is prevented from decreasing suddenly and is controlled so as to decrease gradually.

In the first embodiment, among the stitch rows A21 through A26 of the second sewn-together portion A2, the directions of the stitch rows A21, A26 are the same as the longitudinal direction of the webbing, and the directions of the other stitch rows A22, A28, A24, A25 are inclined with respect to the longitudinal direction of the webbing. Further, all of the stitch rows A21 through A26 are straight lines. However, the present invention is not limited to the same.

Namely, the directions of all of the stitch rows of the second-sewn-together portion A2 may be the same as the longitudinal direction of the webbing, or may all be inclined with respect to the longitudinal direction of the webbing. Further, the direction of inclination and the angle of inclination may be set arbitrarily. The stitch rows may be formed, for example, in arc-shaped curves in directions inclined with respect to the longitudinal direction of the webbing, or may be formed in zig-zags.

In the first embodiment, when the stitching at the stitch rows A21 through A26 of the second sewn-together portion A2 begins to come undone, the load F decreases from the load F3, which undoes the stitching of the stitch row A13 of the first sewn-together portion A1, to the load F4, which undoes the stitching of the stitch rows A21 through A26 of the second sewn-together portion A2. The load F4 is maintained while fraying continues. However, in a case in which the stitch rows of the second sewn-together portion A2 are formed in arc-shaped curves in directions which are inclined with respect to the longitudinal direction of the webbing, the load which undoes the stitching at the stitch rows of the second sewn-together portion A2 is a load which gradually decreases from the load F3 as fraying continues.

Further, by increasing or decreasing the number of stitch rows of the second sewn-together portion A2, the sewing strength can be increased or decreased. The number of stitch rows is not limited, and for example, one stitch row may be used.

In the first sewn-together portion A1, there are three stitch rows and the load is reduced in three stages. Therefore, this structure is effective in preventing a sudden decrease in the load applied between the vehicle occupant 26 and the webbing 12 when the length of the webbing 12 is increased. However, the number of stitch rows is not limited to three. Any number of stitch rows may be formed, and further, the operational effects of the present invention do not deteriorate even if only one row is provided.

In the first sewn-together portion A1, the respective lengths of the stitch rows are different. Accordingly, by varying the number of stitches, the respective sewing strengths of the stitch rows is varied. However, the present invention is not limited to the same, and the respective stitch rows may be formed by sewing threads having different break-resistant strengths.

In the first embodiment, the stitches are orthogonal to the direction of the stitch row. However, the stitches may be in the same direction as the direction of the stitch row.

A webbing for restraining a vehicle occupant, relating to the second embodiment of the present invention will be described on the basis of FIGS. 4 and 5.

Figure 4:
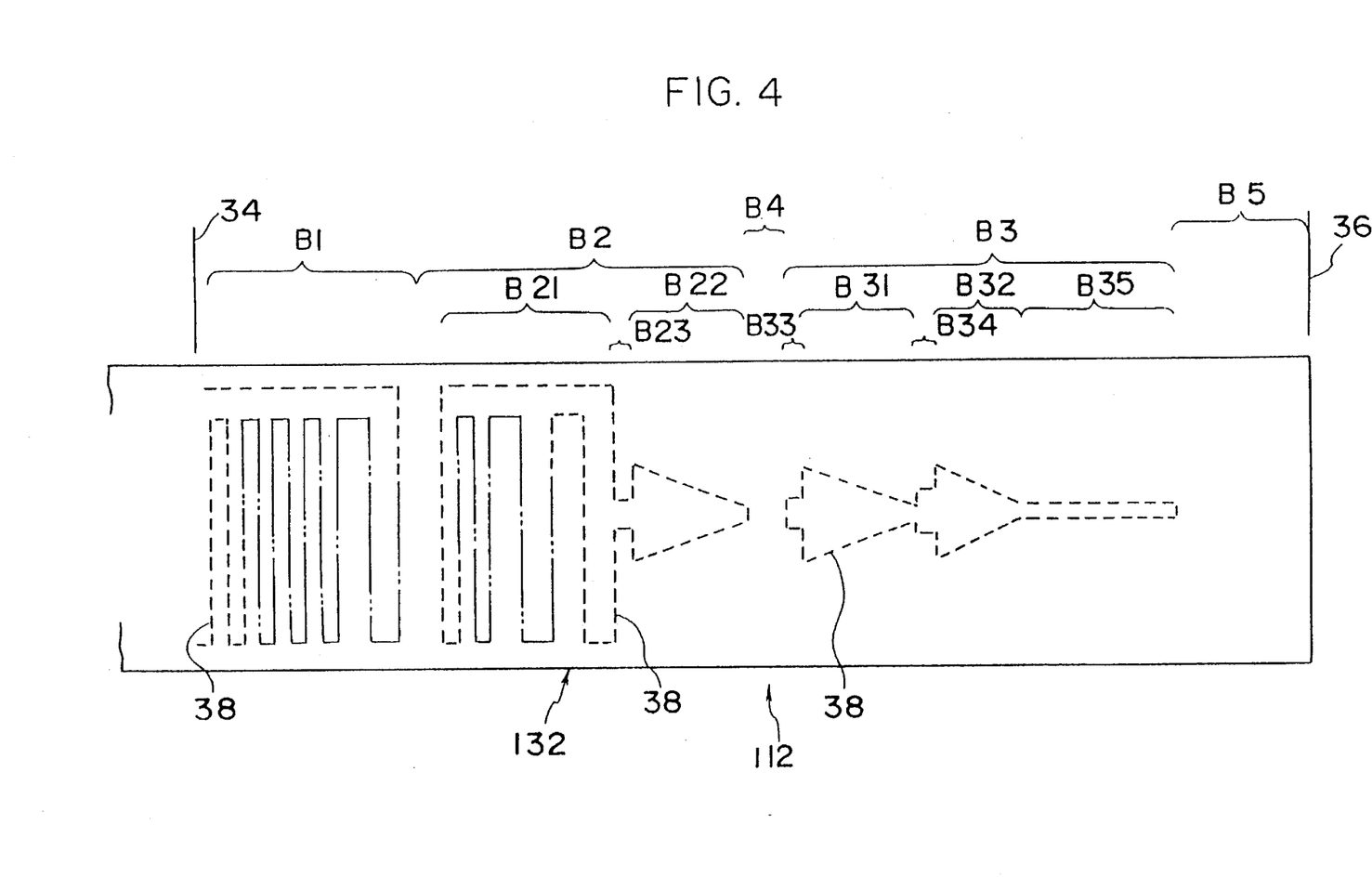
FIG. 4 is a view illustrating a sewn pattern of a webbing length increasing device of a webbing for restraining a vehicle occupant, relating to a second embodiment of the present invention.

As illustrated in FIG. 4, sewn-together portions B1, B2, B3 are provided in that order from the webbing fold base end 34 to the webbing fold tip end 36 at a U-shaped webbing length increasing device 132 of a webbing 112.

The sewn-together portion B1 is of a sewn pattern in which the stitches 38 are formed in rows in the transverse direction of the webbing and a plurality of stitch rows are continuous as if drawn by a single brush stroke (as illustrated by the two-dot chain line).

The sewn-together portion B2 includes a sewn-together portion B21 and a sewn-together portion B22 which is positioned at a central portion of the webbing in the transverse direction thereof at the webbing fold tip end 36 side of the sewn-together portion B21. The sewn-together portion B21 is of the same sewn pattern as the sewn-together portion B1. The sewn-together portion B22 is of a sewn pattern in which the stitches 38 are formed in two rows along inclined sides of a triangle whose peak portion is at the webbing fold tip end 36 side. The sewn-together portions B21, B22 are connected at a sewn-together portion B23 in which the stitches 38 are formed in rows from the bottom side of the above-mentioned triangle, so as to reach the stitch rows of the sewn-together portion B21 which oppose the bottom side of the triangle. The stitch rows of the sewn-together portions B21, B22 are continuous as if drawn by a single brush stroke, via the sewn-together portion B23.

The sewn-together portion B3 includes a sewn-together portion B31 and a sewn-together portion B32 which is positioned at the webbing fold tip end 36 side of the sewn-together portion B31. Both of the sewn-together portions B31, B32 are of a sewn pattern in which the stitches 38 are formed in two rows along the inclined sides of a triangle, in the same way as the sewn-together portion B22. At the webbing fold base end 34 sides of the sewn-together portions B31, B32, sewn-together portions B33, B34 are provided respectively, in which portions the stitches 38 are formed along the outline of a convex portion which protrudes from the bottom portion of a triangle toward the outside of the triangle. The webbing fold tip end 36 side of the sewn-together portion B31 reaches the sewn-together portion B34. The webbing fold tip end 36 side of the sewn-together portion B31 reaches the sewn-together portion B34. At the webbing fold tip end 36 side of the sewn-together portion B32, a sewn-portion B35, whose stitches 38 are formed in two lines in the longitudinal direction of the webbing, extends toward the webbing fold tip end 36.

In the sewn-together portion B3 formed from the sewn-together portions B31 through B35, the stitch rows are continuous as if drawn by a single brush stroke.

The sewn-together portions B1, B21 form a first sewn-together portion, and the sewn-together portions B22, B31, B32, B35 form a second sewn-together portion.

A small unsewn portion B4 is formed between the sewn-together portions B2, B3, and an unsewn portion B5 is formed between the sewn-together portion B3 and the webbing fold tip end 36. Note that the stitches 38 are in the same directions as the directions of the stitch rows.

Next, operation of the second embodiment will be described.

When the vehicle occupant 26 is restrained by the webbing 112, the tensile load F (see FIG. 2) acts on the webbing 112. Due to the load F, the stitching of the respective sewn-together portions successively comes undone from the webbing fold base end 34 toward the webbing fold tip end 36. As the stitching comes undone, the length of the webbing 112 is increased. Inertial movement of the vehicle occupant 26 by an amount, which corresponds to the amount by which the length of the webbing 112 is increased, is allowed, so that the pressure applied to the vehicle occupant 26 is suppressed.

At the sewn-together portion B1, the break-resistant load of the sewing thread is the sewing strength. The sewing strength is large at the sewn-together portion B1 (the same is true of the sewn-together portion B21). As illustrated in FIG. 5, when the load F increases to load F21, the load F exceeds the break-resistant load of the sewing thread, and the stitching of the stitch rows comes undone successively towards the webbing fold tip end 36.

Immediately thereafter, at the sewn-together portion B21 as well, the stitching of the stitch rows comes undone successively at the load F21.

At the sewn-together portion B23, the load F temporarily decreases from the load F21, and then slightly rises to load F22.

At the sewn-together portion B22, even if the sewing thread does not break, the stitching comes undone due to the fraying of the sewing thread. The sewing strength of the sewn-together portion B22 is small (as are the respective sewing strengths of the sewn-together portions B31, B32, B35). The load F decreases from the load F22 to load F23, and the stitching of the sewn-together portion B22 comes undone. While fraying of the sewing thread continues, the load F23 is maintained.

At the unsewn portion B4, the load F is temporarily reduced from the load F23. At the sewn-together portion B33, the load F increases again and reaches the load F22.

In the same way as at the sewn-together portion B22, at the sewn-together portion B31, the load F falls from the load F22 to the load F23, and the stitching of the sewn-together portion B31 comes undone. While fraying of the sewing thread continues, the load F23 is maintained.

At the sewn-together portion B34, the load F increases from the load F23 to the load F22. In the same way as at the sewn-together portions B22, B31, at the sewn-together portion B32, the load F falls from the load F22 to the load F23, and the stitching of the sewn-together portion B32 comes undone. While fraying continues, the load F23 is maintained.

At the sewn-together portion B35, the load F decreases from the load F23 to the load F24, and the stitching of the sewn-together portion B35 comes undone. While fraying continues, the load F24 is maintained.

In other words, when the stitching of the sewn-together portions B22, B31, B32, B35 begins to come undone, the load decreases to loads F23, F24 which are smaller than the load F21 which undoes the stitching of the sewn-together portions B1, B21. While the stitching of the sewn-together portions B22, B31, B32, B35 is coming undone, the small loads F23, F24 do not fall to even smaller loads.

At the unsewn portion B5, the load F is reduced again from the load F24, the folded-over portion of the webbing 112 disappears, and the entire webbing 112 becomes linear. When the webbing 112 becomes linear, from then on, inertial movement of the vehicle occupant 26 is restricted, and accordingly, the load F increases.

Figure 5:
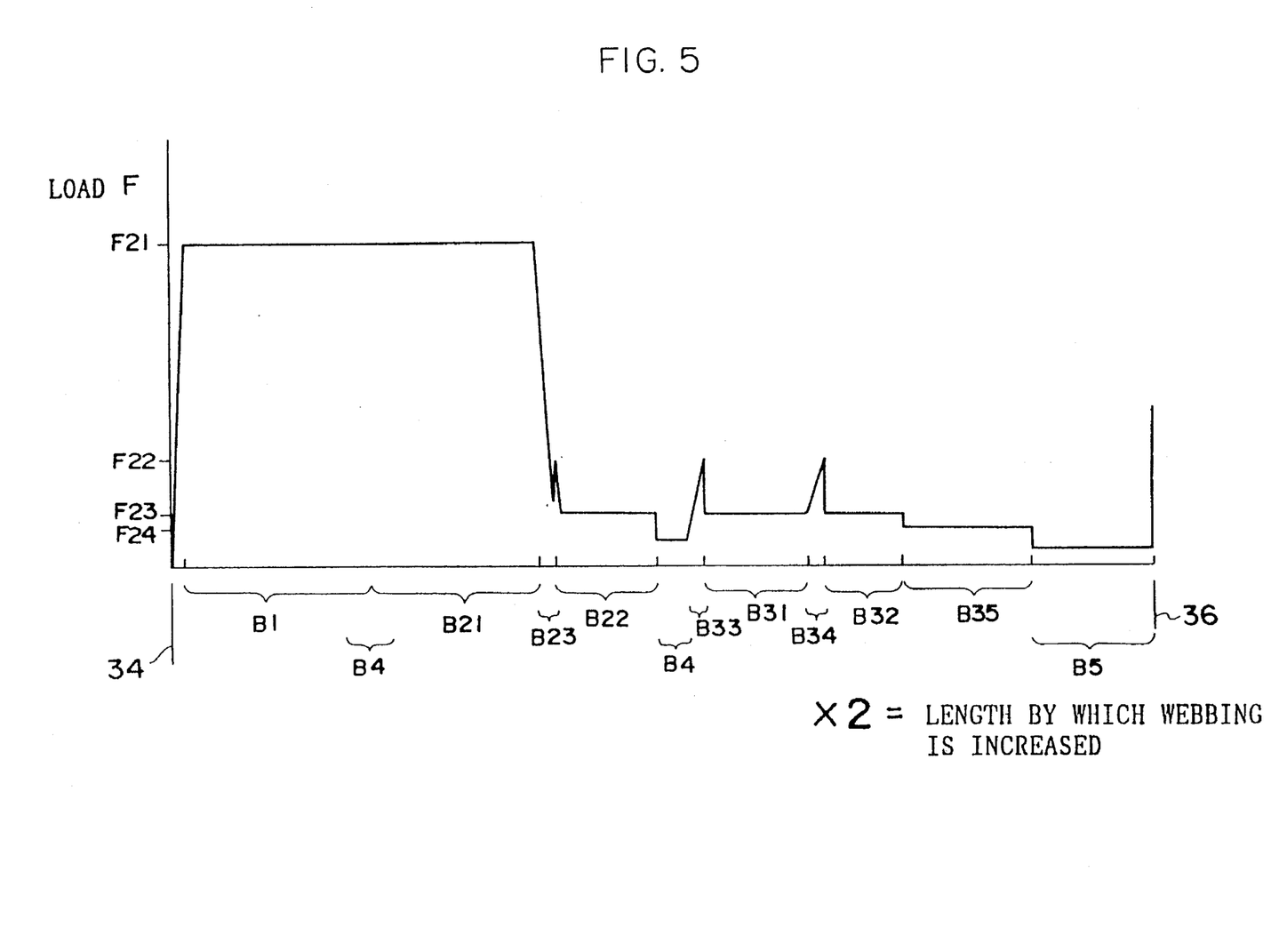
FIG. 5 is a view illustrating the relation between tensile load applied to the webbing and an increase in length of the webbing, for the webbing for restraining a vehicle occupant relating to the second embodiment.

In the graph in FIG. 5, the load F is constant at each of the sewn-together portions B1, B21, B22, B31, B32, B35. However, when viewed very closely, at the sewn-together portions B1, B21, the load F repeatedly decreases and increases so as to decrease to less than the load F21 immediately after the stitching of one stitch row is undone and so as to increase to the load F21 when the stitching of the next stitch row is coming undone. Further, at the sewn-together portions B22, B31, B32, B35, the load F repeatedly decreases and increases so as to decrease to less than the loads F23, F24 immediately after the stitching of one stitch row is undone and so as to increase to the loads F23, F24 when the stitching of the next stitch row is coming undone. The same holds true for the third embodiment, which will be described later.

Accordingly, when the length of the webbing 112 is increased, the load applied between the webbing 112 and the vehicle occupant 26 is controlled so as to decrease gradually. Even if the length of the webbing is increased by a large amount, a sudden decrease in load is prevented.

In addition to seat belt devices, the present invention may also be provided in other vehicle occupant protection devices such as air bag devices, knee pad devices or the like. When these vehicle occupant protection devices are operated interrelatedly with the device of the present invention, there are cases in which it is necessary for the webbing of the present invention to permit more inertial movement of the vehicle occupant. The present invention is particularly effective in such cases. In order to permit more inertial movement of the vehicle occupant, it is necessary to restrain the vehicle occupant reliably with the proper restraining force. In the present invention, by making the folded-over portion of the webbing long, i.e., by increasing the length of the webbing by a large amount, the vehicle occupant can be restrained reliably with the proper restraining force.

Further, the sewn-together portions B23, B33, B34 and the unsewn portion B4 may be eliminated such that the first sewn-together portion and the second sewn-together portion are directly connected.

Next, a third embodiment will be described on the basis of FIGS. 6 and 7.

Figure 6:
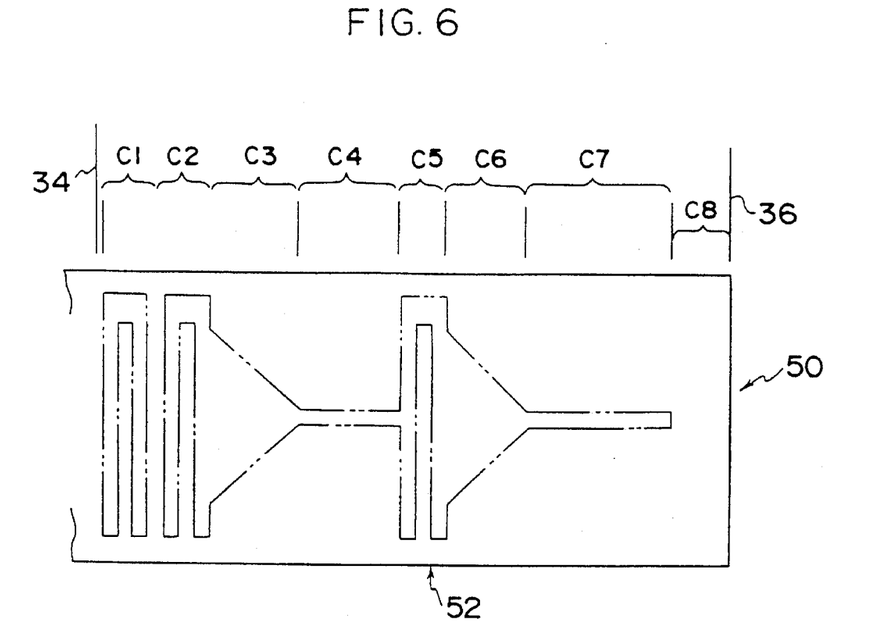
FIG. 6 is a view illustrating a sewn pattern of a webbing length increasing device of a webbing for restraining a vehicle occupant, relating to a third embodiment of the present invention.

In the third embodiment, as illustrated in FIG. 6, sewn-together portions C1 through C7 are provided in that order from the webbing fold base end 34 toward the webbing fold tip end 36 of a webbing length increasing device 52 of a webbing 50. In FIG. 6, the stitch rows are illustrated by the two-dot chain line.

In the same way as sewn-together portion B1 of the second embodiment, the sewn-together portions C1, C2, C5 are of a sewn pattern in which the stitches are aligned in the transverse direction of the webbing. In the same way as the sewn-together portion B22 of the second embodiment, the sewn-together portions C3, C6 are of a sewn pattern in which the stitches are formed in two rows along inclined sides of a triangle. Further, in the same way as the sewn-together portion B35 of the second embodiment, the sewn-together portions C4, C7 are of a sewn pattern in which the stitches are formed in two rows in the longitudinal direction of the webbing. The stitch rows of the sewn-together portion C1 are continuous as if drawn by a single brush stroke, as are the stitch rows of the sewn-together portions C2 through C7.

In the same way as in the second embodiment, the sewing strengths of the sewn-together portions C3, C6 are smaller than those of the sewn-together portions C1, C2, C5. The sewing strengths of the sewn-together portions C4, C7 are smaller than those of the sewn-together portions C3, C6. At the sewn-together portions C1, C2, C5, the break-resistant load of the sewing thread becomes the sewing strength. At the sewn-together portions C3, C6, C4, C7, even if the sewing thread does not break, the stitching is undone due to the fraying of the sewing thread.

The sewn-together portions C1, C2 form a first sewn-together portion. The sewn-together portions C3, C4, which correspond to the sewn-together portions C1, C2, form a second sewn-together portion. Separately, the sewn-together portion C5 forms a first sewn-together portion, and the sewn-together portions C6, C7, which correspond to the sewn-together portion C5, form a second sewn-together portion.

An unsewn portion C8 is formed between the sewn-together portion C7 and the webbing fold tip end 36.

In accordance with the above-described structure, in the same way as in the second embodiment, the stitching of the respective sewn-together portions comes undone successively from the webbing fold base end 34 to the webbing fold tip end 36 due to the tensile load F which is applied to the webbing 50. As the stitching comes undone, the length of the webbing 50 is increased, inertial movement of the vehicle occupant 26 is permitted, and the pressure applied to the vehicle occupant 26 is suppressed.

Figure 7:
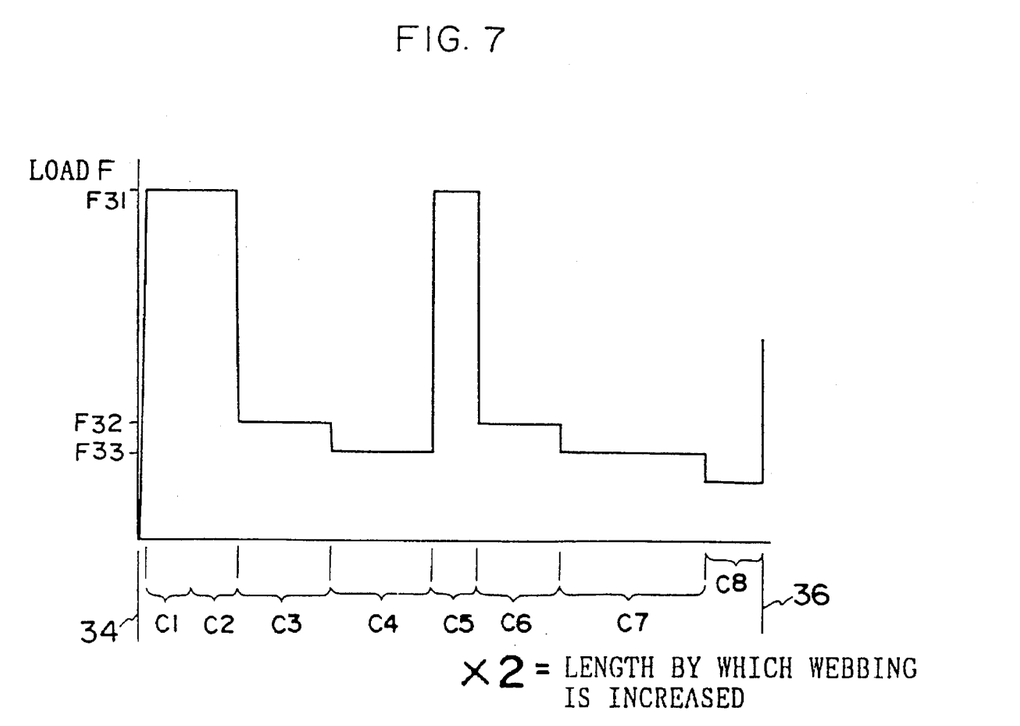
FIG. 7 is a view illustrating the relation between tensile load applied to the webbing and an increase in length of the webbing, for the webbing for restraining a vehicle occupant relating to the third embodiment.

As illustrated in FIG. 7, when the load F reaches load F31, the stitching of the sewn-together portion C1 comes undone, and immediately thereafter, the stitching of the sewn-together portion C2 comes undone.

At the sewn-together portion C3, the load F falls from the load F31 to load F32. While fraying continues, the load F32 is maintained. At the sewn-together portion C4, the load F falls from the load F32 to load F33, and while fraying continues, the load F33 is maintained.

At the sewn-together portion C5, the load F increases from the load F33 to the load F31, and the stitching comes undone.

At the sewn-together portion C6, in the same way as at the sewn-together portion C3, the load F falls from the load F31 to the load F32. While fraying continues, the load F32 is maintained.

In the same way as at the sewn-together portion C4, at the sewn-together portion C7, the load F is reduced from the load F32 to the load F33. The load F33 is maintained while fraying continues.

At the unsewn portion C8, the load F falls further from F33, the folded-over portion of the webbing 50 disappears, and the entire webbing 50 becomes linear. From then on, inertial movement of the vehicle occupant 26 is restrained.

The third embodiment differs from the second embodiment in that, in the third embodiment, two sets of the first and second sewn-together portions are provided, whereas in the second embodiment, only one set of the first and second sewn-together portions is provided. However, the same effects of the second embodiment are achieved by the third embodiment as well. Namely, when the length of the webbing is increased, the load applied between the webbing and the vehicle occupant is controlled so as to decrease gradually. Even if the length of the webbing is increased by a large amount, a sudden reduction in load can be prevented.

The present invention is not limited to one or two sets of the first and second sewn-together portions, and three or more sets may be provided.

In the second embodiment, the second sewn-together portion is formed by a plurality of sewn-together portions, i.e., the sewn-together portions B22, B31, B32, in which the directions of the stitch rows are inclined with respect to the longitudinal direction of the webbing, and the sewn-together portion B35, in which the directions of the stitch rows are the same as the longitudinal direction of the webbing. In the third embodiment, the second sewn-together portion is formed by a plurality of sewn-together portions, i.e., the sewn-together portion C3 (C6), in which the directions of the stitch rows are inclined with respect to the longitudinal direction of the webbing, and the sewn-together portion C4 (C7), in which the directions of the stitch rows are the same as the longitudinal direction of the webbing. However, the present invention is not limited to the above-described structures.

Namely, the number of sewn-together portions forming the second sewn-together portion is not limited, and a single sewn-together portion may be used to form the second sewn-together portion. Further, the directions of the stitch rows of the sewn-together portions may be the same direction as or may be inclined with respect to the longitudinal direction of the webbing. Moreover, the direction of inclination and the angle of inclination may be set arbitrarily. The stitch rows may be formed, for example, in arc-shaped curves in directions inclined with respect to the longitudinal direction of the webbing, or may be formed in zig-zags.

For the first sewn-together portion as well, the number of sewn-together portions forming the first sewn-together portion is not limited to a plural number, and a single sewn-together portion may be used.

The sewing strengths of the first and second sewn-together portions can be increased or decreased by increasing or decreasing the number of stitch rows thereof. The number of stitch rows in each sewn-together portion is not limited, and, for example, a single stitch row suffices. In the first sewn-together portion, in the same way as in the first embodiment, the lengths of the respective stitch rows may be varied so that the load F is reduced in stages.

In both the first and second embodiments, when the stitching of the sewn-together portion B22 forming the second sewn-together portion begins to come undone, the load F is reduced from the load F22, which undoes the stitching of the sewn-together portion B23, to the load F23, which undoes the stitching of the sewn-together portion B22. The load F23 is maintained while fraying continues. However, in a case in which the stitch rows of the sewn-together portion B22 are formed in arc-shaped curves in directions inclined with respect to the longitudinal direction of the webbing, the load which undoes the stitching of the sewn-together portion B22 becomes a load which gradually falls from the load F22 as fraying continues. The same holds true for sewn-together portions B31, B32, as well as for the third embodiment.

In the second and third embodiments, the stitches are in the same direction as the directions of the stitch rows. However, the stitches may be orthogonal to the directions of the stitch rows.

Next, the fourth embodiment will be described on the basis of FIGS. 8 and 9.

Figure 8:
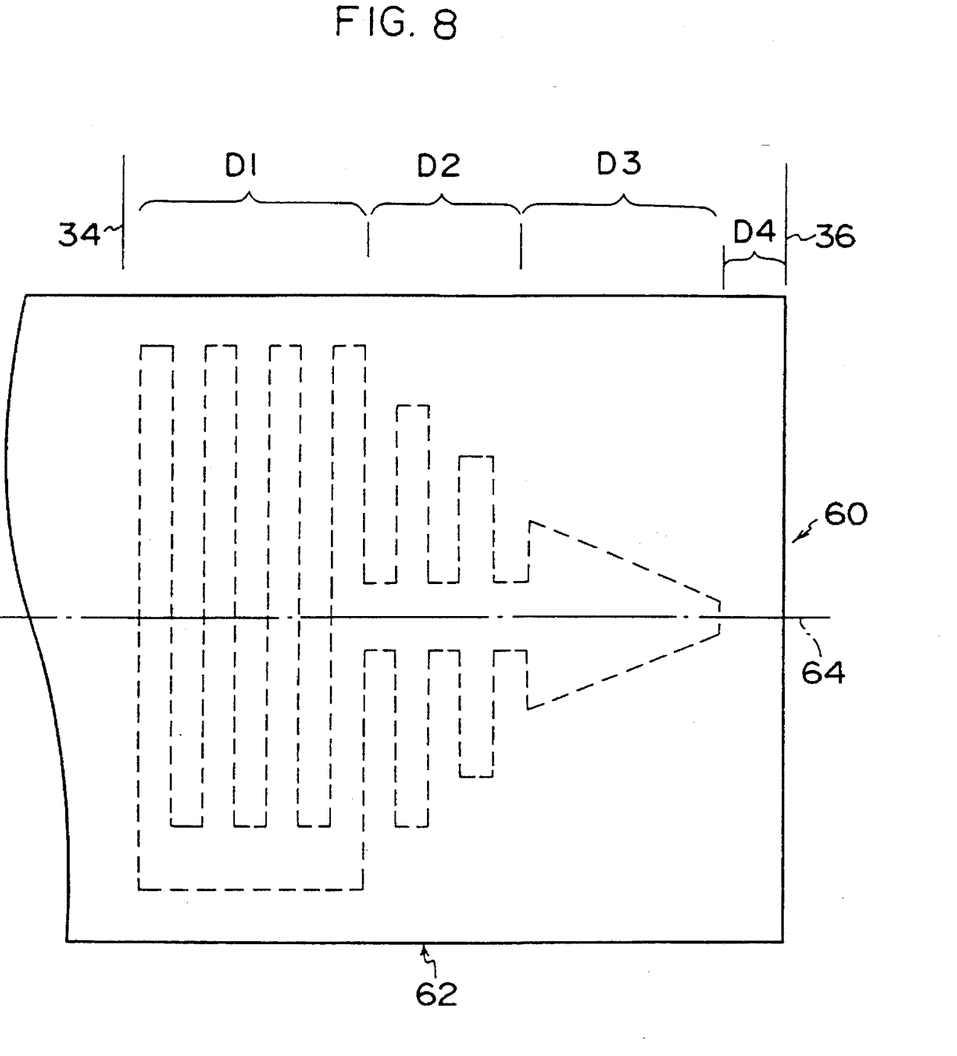
FIG. 8 is a view illustrating a sewn pattern of a webbing length increasing device of a webbing for restraining a vehicle occupant, relating to a fourth embodiment of the preset invention.

In the fourth embodiment, as illustrated in FIG. 8, sewn-together portions D1 through D3 are provided in that order from the webbing fold base end 34 to the webbing fold tip end 36 of a webbing length increasing device 62 of a webbing 60. In FIG. 8, the stitches are illustrated by the dashed line.

The sewn-together portion D1 is a sewn pattern in which the stitches are formed in rows of the same length in the transverse direction of the webbing.

The sewn-together portion D2 is a sewn pattern in which the stitches are formed in rows whose respective lengths in the transverse direction of the webbing gradually become smaller toward the webbing fold tip end 36 and the number of stitches on either side of a transverse direction central line 64 of the webbing is equal.

The sewn-together portion D3 is a sewn pattern in which the stitches are aligned in two rows along the inclined sides of a triangle. The stitch rows of the sewn-together portions D1 through D3 are continuous as if drawn by a single brush stroke.

The sewing strength of the sewn-together portion D2 is smaller than that of the sewn-together portion D1. The sewing strength of the sewn-together portion D3 is smaller than that of the sewn-together portion D2. At the sewn-together portions D1, D2, the break-resistant load of the sewing thread becomes the sewing strength. At the sewn-together portion D3, even if the sewing thread does not break, the stitching comes undone due to the fraying of the sewing thread. The breaking load of the sewn-together portions D2, D3 gradually decreases toward the webbing fold tip end 36.

The sewn-together portion D1 forms a first sewn-together portion. The sewn-together portions D2, D3, which correspond to the sewn-together portion D1, form a second sewn-together portion.

In accordance with the above-described structure, due to the tensile load F which is applied to the webbing 60, the stitching of the sewn-together portions successively comes undone from the webbing fold base end 34 to the webbing fold tip end 36. As the stitching comes undone, the length of the webbing 60 is increased, inertial movement of the vehicle occupant 26 is permitted, and the pressure applied to the vehicle occupant 26 is suppressed.

Figure 9:
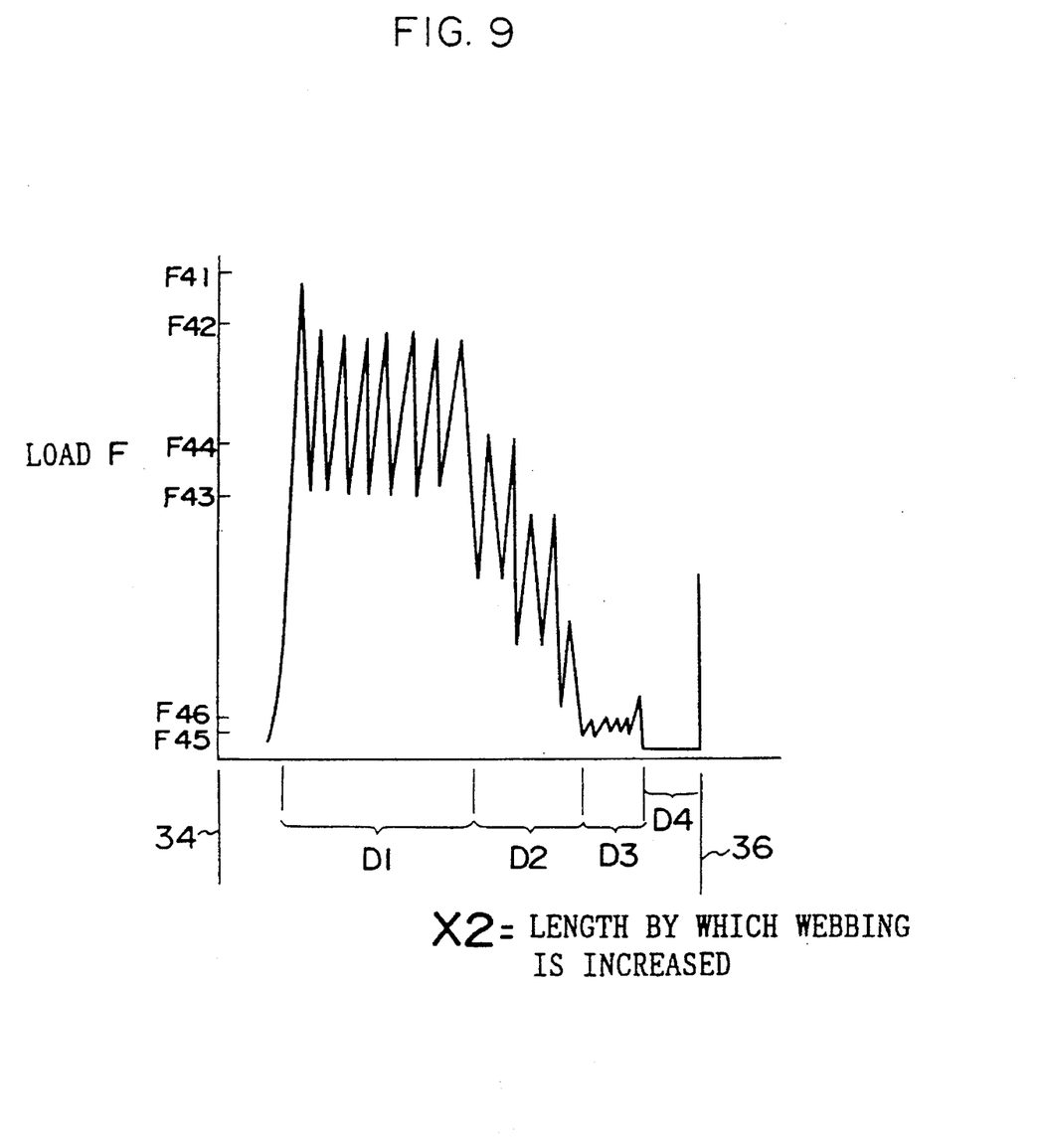
FIG. 9 is a view illustrating the relation between tensile load applied to the webbing and an increase in length of the webbing, for the webbing for restraining a vehicle occupant relating to the fourth embodiment.

As illustrated in FIG. 9, when the load F reaches load F41, the stitching of the sewn-together portion D1 comes undone, and subsequently, the stitching of the sewn-together portions D2, D3 comes undone.

At the sewn-together portion D1, the load F fluctuates up and down between load F42 and load F43, which is smaller than the load F42. At the sewn-together portion D2, the load F falls from load F44 to load F45, which is smaller than the load F43, while fluctuating up and down. At the sewn-together portion D3, while fraying continues, the load F fluctuates up and down between the load F45 and load F46, which is greater than the load F45.

At the unsewn portion D4, the load F falls even further from the load F45, the folded-over portion of the webbing 60 disappears, and the entire webbing 60 becomes linear. From then on, inertial movement of the vehicle occupant 26 is restrained.

Accordingly, when the length of the webbing is increased, the load applied between the vehicle occupant and the webbing is controlled such that a sudden reduction in the load is prevented, and the load is decreased gradually. Further, at the sewn-together portion D2, the number of sewn stitches gradually decreases toward the webbing fold tip end 36. Namely, due to the gradual decrease in the number of sewn stitches, the breaking load can be set easily. Moreover, at the sewn-together portion D2, because the number of stitches is equal on either side of the transverse direction central line 64 of the webbing, tension at the sewn-together portion D2 is not unbalanced at the left and right sides of the transverse direction central line 64 of the webbing, and the load applied between the vehicle occupant and the webbing is stable and decreases gradually.

Next, a fifth embodiment will be described on the basis of FIGS. 10 and 11.

Figure 10:
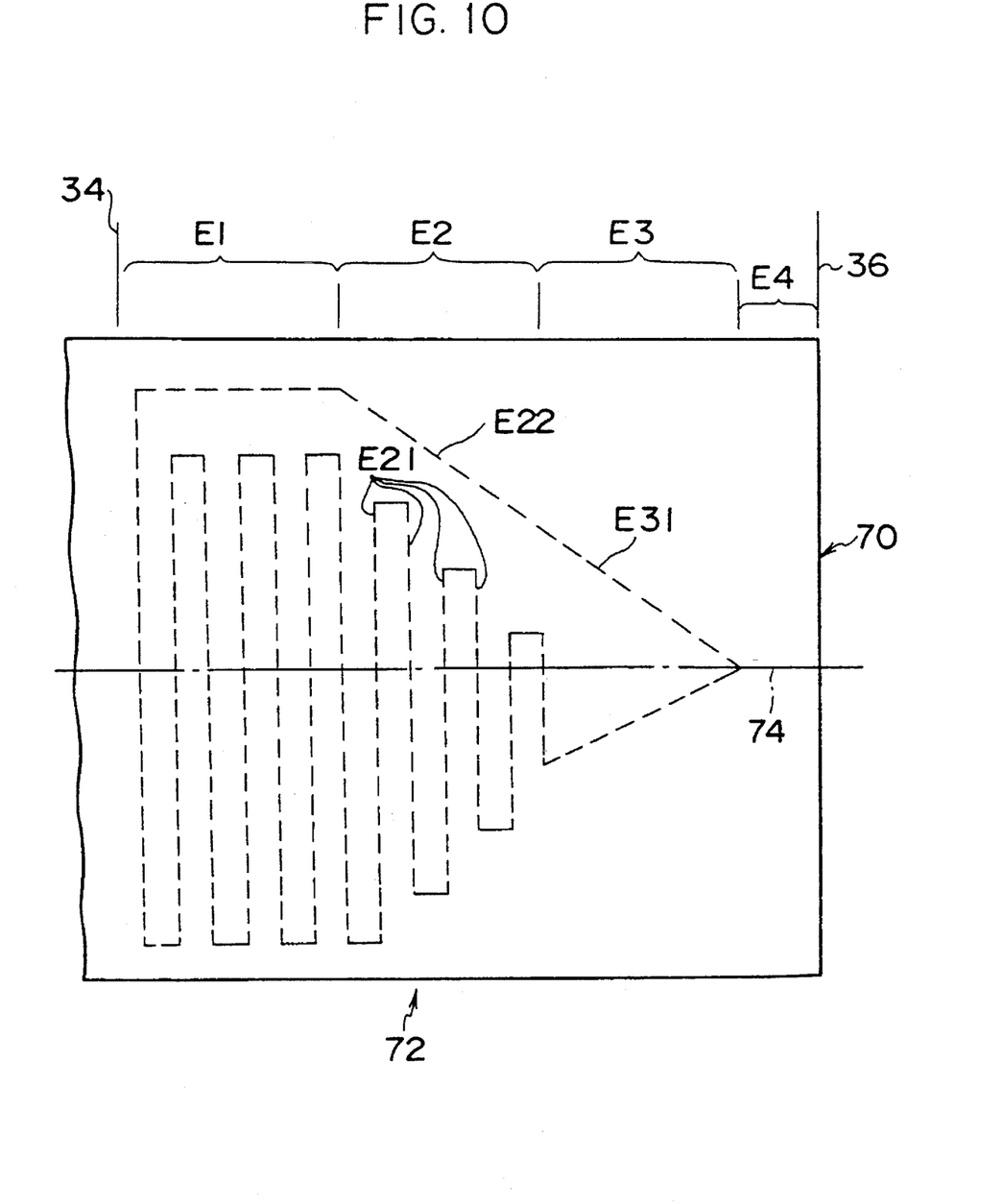
FIG. 10 is a view illustrating a sewn pattern of a webbing length increasing device of a webbing for restraining a vehicle occupant, relating to a fifth embodiment of the present invention.

In the fifth embodiment, as illustrated in FIG. 10, sewn-together portions E1 through E3 are provided in that order from the webbing fold base end 34 toward the webbing fold tip end 36 of a webbing length increasing device 72 of a webbing 70. In FIG. 10, the stitches are illustrated by the dashed line.

The sewn-together portion E1 is of a sewn pattern in which the stitches are formed in rows of the same length in the transverse direction of the webbing.

The sewn-together portion E2 is formed of transverse patterns E21 in which the stitches are formed in rows whose respective lengths in the transverse direction of the webbing gradually decrease towards the webbing fold tip end 36.

The sewn-together portion E3 is a sewn pattern in which the stitches are formed in two rows along inclined sides of a triangle. The stitches of the sewn-together portions E1 through E3 are continuous as if drawn by a single brush stroke. Further, the sewn-together portion E2 also includes a substantially longitudinal pattern E22 which is inclined with respect to a transverse direction central line 74 of the webbing 70 and which extends in the longitudinal direction of the webbing so as to connect with one inclined side E31 of the triangle of the sewn-together portion E3.

The sewing strength of the sewn-together portion E2 is smaller than that of the sewn-together portion E1. Further, the sewing strength of the sewn-together portion E3 is smaller than that of the sewn-together portion E2. At the sewn-together portions E1, E2, the break-resistant load is the sewing strength. At the sewn-together portion E3, even if the sewing thread does not break, the stitching comes undone due to the fraying of the sewing thread. The breaking load of the sewn-together portions E2, E3 becomes gradually smaller toward the webbing fold tip end 36.

The sewn-together portion E1 forms a first sewn-together portion, and the sewn-together portions E2, E3, which correspond to the sewn-together portion E1, form a second sewn-together portion.

In accordance with the above-described structure, due to the tensile load F which is applied to the webbing 70, the stitching of the respective sewn-together portions successively comes undone from the webbing fold base end 34 toward the webbing fold tip end 36. As the stitching comes undone, the length of the webbing 70 increases, inertial movement of the vehicle occupant 26 is permitted, and the pressure applied to the vehicle occupant 26 is suppressed.

Figure 11:
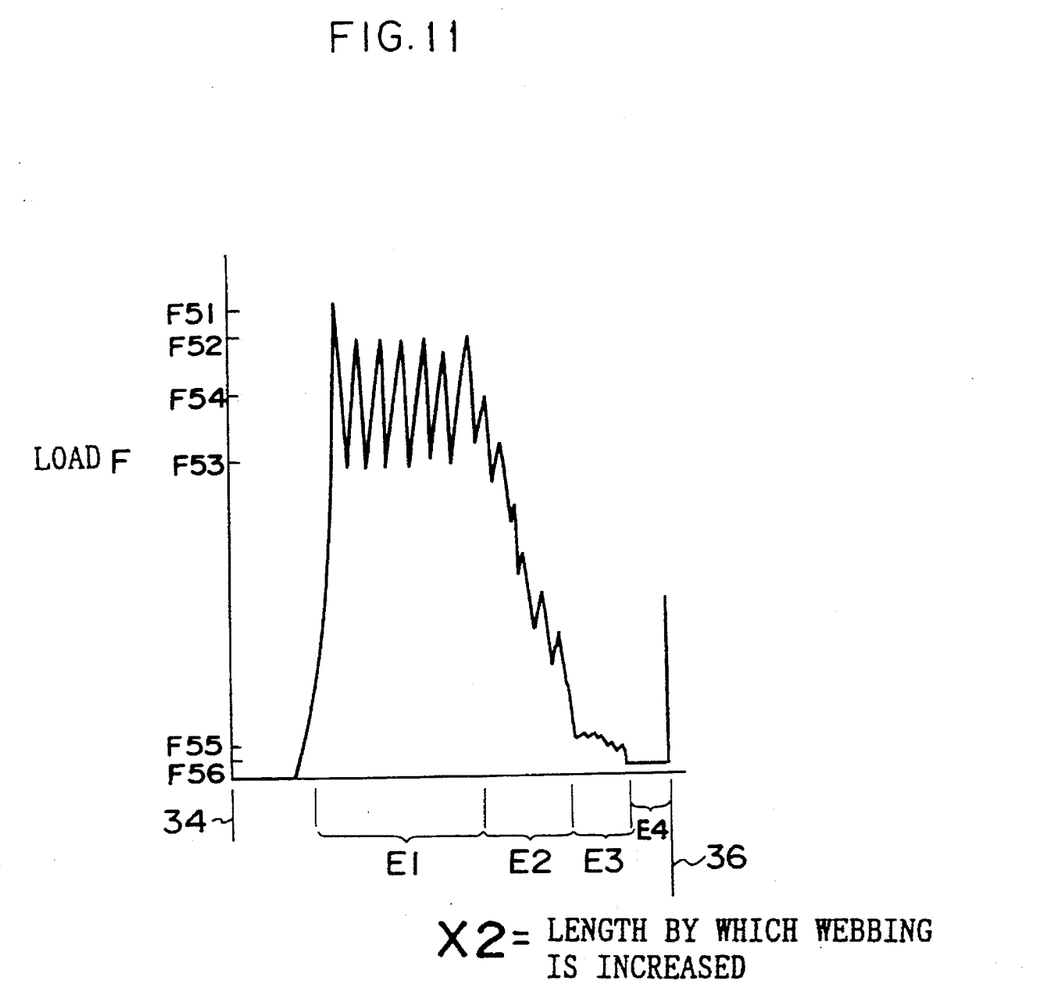
FIG. 11 is a view illustrating the relation between tensile load applied to the webbing and an increase in length of the webbing, for the webbing for restraining a vehicle occupant relating to the fifth embodiment.

As illustrated in FIG. 11, when the load F reaches load F51, the stitching of the sewn-together portion E1 comes undone, and subsequently, the stitching of the sewn-together portions E2, E3 comes undone.

At the sewn-together portion E1, the load F fluctuates up and down between load F52 and load F53, which is smaller than the load F52. At the sewn-together portion E2, the load F falls from load F54 to load F55, which is smaller than the load F53, while fluctuating up and down. At the sewn-together portion E3, while fraying continues, the load F fluctuates up and down and falls to load F56.

At this time, at the sewn-together portion E2, an increase in the load F between the respective transverse patterns E21 can be suppressed by the substantially longitudinal pattern E22. As a result, the fluctuations in the load become smooth. Accordingly, when the length of the webbing is increased, the load applied between the vehicle occupant and the webbing falls smoothly.

At the unsewn portion E4, the load F falls further from the load F56, the folded-over portion of the webbing 70 disappears, and the entire webbing 70 becomes linear. From then on, the inertial movement of the vehicle occupant 26 is restrained.

Accordingly, when the length of the webbing increases, the load applied between the vehicle occupant and the webbing is controlled such that a sudden decrease in the load is prevented, and the load decreases gradually.

The present invention is not limited to the first through the fifth embodiments, and a variety of modifications are possible provided that the gist of the invention is maintained.

For example, the sewn patterns are not limited to those of the above-described embodiments, and various sewn patterns are possible.

In the first through the fifth embodiments, a plurality of stitch rows are formed so as to be continuous, as if drawn by a single brush stroke. However, the present invention is not limited to the same, and each stitch row may be formed separately.

It suffices that the first sewn-together portion and the second sewn-together portion are not continuous as if formed by a single brush stroke; the first and second sewn-together portions may be provided separately.

Further, in the first through the fifth embodiments, explanation is given of a webbing of a three-point seat belt device. However, the seat-belt device is not limited to a three-point type.

It is not absolutely necessary to provide the unsewn portions B5, C8, D4, E4 of the second through the fifth embodiments.

What is claimed is:

1. An elongated webbing for restraining a vehicle occupant, comprising:

a webbing length increasing device including a fold sewn into said webbing by a plurality of stitches, said fold being formed along a transverse direction of said webbing and being defined on one side by a fold tip end such that when a load applied between a vehicle occupant and said webbing length increasing device exceeds a stitch strength of said webbing length increasing device, said stitches of said webbing length increasing device come undone, said webbing length increasing device having at least a first sewn-together portion and a second sewn-together portion, each having rows of stitches, said second sewn-together portion being adjacent to said tip end side of said fold and having a stitch strength which is smaller than a stitch strength of said first sewn-together portion, wherein the load required to break the stitches of said second sewn-together portion diminishes the closer said stitches are to the webbing fold tip end side, and said rows of stitches of said second sewn-together portion are inclined with respect to the longitudinal axis of said webbing.

2. A webbing for restraining a vehicle occupant according to claim 1, wherein said breaking load is determined by a number of stitches which are sewn.

3. A webbing for restraining a vehicle occupant according to claim 2, wherein said number of stitches is equal on either side of a line which runs along said longitudinal axis of said webbing.

4. A webbing for restraining a vehicle occupant according to claim 1, wherein said breaking lead of said second sewn-together portion is set by a number of rows of stitches.

5. A webbing for restraining a vehicle occupant according to claim 1, wherein the rows of stitches of said second sewn-together form a triangular configuration around a line which runs along said longitudinal axis of said webbing, said triangular configuration narrowing towards the webbing fold tip end.

6. A webbing for restraining a vehicle occupant according to claim 1, wherein said rows of stitches of said second sewn-together portion are formed along the longitudinal axis of said webbing.

7. A webbing for restraining a vehicle occupant according to claim 1, wherein said second sewn-together portion is formed of at least one transverse pattern of stitches, in which rows of stitches are formed at predetermined lengths in said transverse direction of said webbing, and at least one substantially longitudinal pattern of stitches, in which rows of stitches extend substantially along said longitudinal axis of said webbing.

8. A webbing for restraining a vehicle occupant according to claim 1, wherein said rows of stitches of said second sewn-together portion are interconnected so as to be continuous.

9. A webbing for restraining a vehicle occupant according to claim 1, wherein the load required to break the stitches of said first sewn-together portion diminishes the closer said stitches are to the webbing fold tip end side.

10. A webbing for restraining a vehicle occupant according to claim 9, wherein said breaking load is set by a number of stitches which are sewn.

11. A webbing for restraining a vehicle occupant according to claim 9, wherein said breaking load of said first sewn-together portion is set by sewing said first sewn-together portion with threads of different break-resistant strengths.

12. A webbing for restraining a vehicle occupant according to claim 9, wherein said rows of stitches of said first sewn-together portion are formed in a substantially transverse direction of said webbing.

13. A webbing for restraining a vehicle occupant according to claim 12, wherein respective lengths of said rows of stitches of said first sewn-together portion in the transverse direction of said webbing become smaller towards the webbing fold tip end side.

14. A webbing for restraining a vehicle occupant according to claim 1, wherein rows of stitches of said first sewn-together portion are interconnected so as to be continuous.

15. A webbing for restraining a vehicle occupant according to claim 1, wherein said stitches of said first sewn-together portion come undone due to thread breaking when the load applied between the vehicle occupant and said first sewn-together portion exceeds the stitch strength of said first sewn-together portion, and the stitches of said second sewn-together portion come undone due to thread fraying when the load applied between the vehicle occupant and said second sewn-together portion exceeds the stitch strength of said second sewn-together portion.

16. A webbing for restraining a vehicle occupant according to claim 1, wherein said rows of stitches of said first and second sewn-together portions are interconnected so as to be continuous.

17. A webbing for restraining a vehicle occupant according to claim 1, wherein said rows of stitches of said first and second sewn-together portions are respectively formed in separate rows.

18. A webbing for restraining a vehicle occupant according to claim 1, wherein said webbing length increasing device includes a plurality of combinations of said first and second sewn-together portions.

\* \* \* \* \*